COATED FOAMABLE STYRENE POLYMER PARTICLES

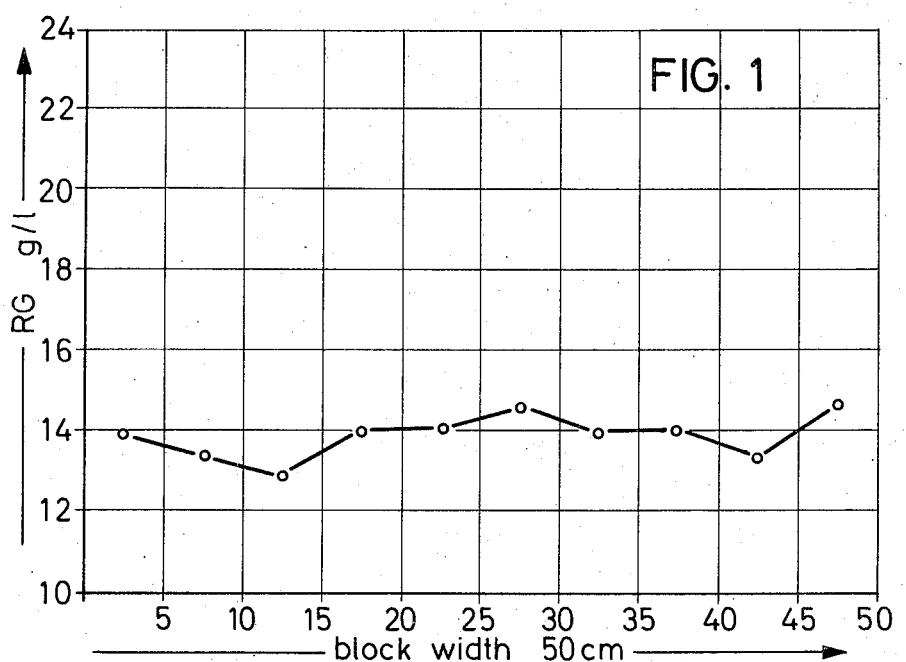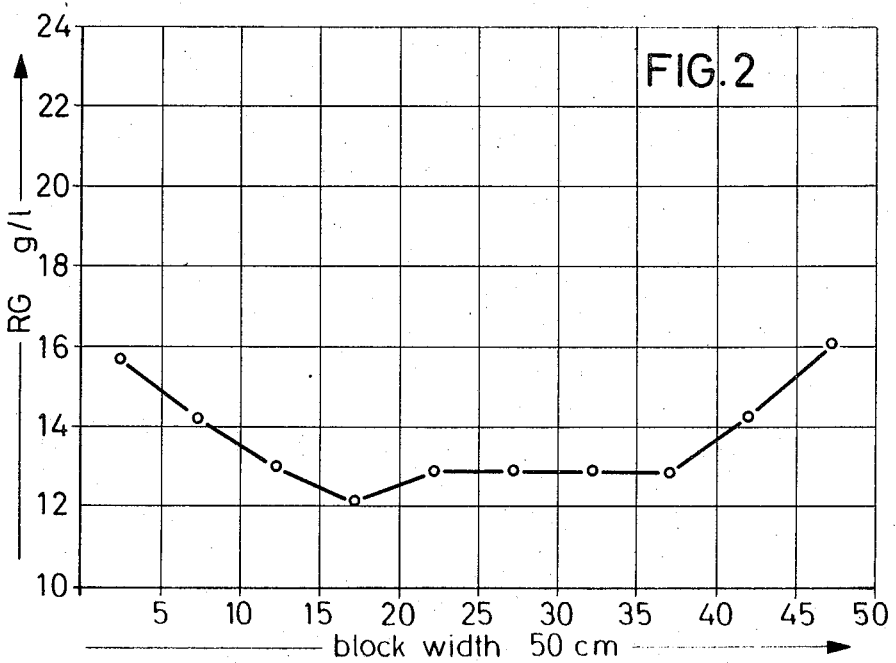

Elmar Heiskel, Langen, and Hartmut Last, Fischbach, Taunus, Germany, assignors to Farbwerke Hoechst Aktiengesellschaft vormals Meister Lucius & Bruning, Frankfurt am Main, Germany
Filed July 3, 1972, Ser. No. 268,831
Claims priority, application Germany, July 5, 1971, P 21 33 253.6
Int. Cl. C08j 1/26
U.S. Cl. 260—2.5 B    3 Claims

ABSTRACT OF THE DISCLOSURE

Foamable particles of the styrene polymers and a volatile blowing agent and a lipophilic surface-active coating agent, wherein these particles contain, as a coating agent, from 0.05 to 0.5% by weight, calculated on the blowing agent containing styrene polymer, of mixtures of mono-, di- and tri-esters of glycerol with saturated fatty acids having from 12 to 22 carbon atoms, or mixtures thereof. These foamable particles offer an essential shortening of the cooling time during foaming, a better bond of the foamed particles and a substantially uniform distribution of the gross unit weight in the finished foam block.

---

This present invention relates to foamable styrene polymer particles.

Before being processed, generally by pre-foaming, intermediate storage and foaming (final foaming) in molding tools, polystyrene particles containing blowing agents have to be treated with processing auxiliary agents in order to prevent clogging and the build-up of electrostatic charge during pre-foaming and to ensure sufficient flow capacity. It is customary to treat the pre-foamed particles with other additives, e.g., paraffin oils or waxes so as to shorten the cooling time in the molds and to render uniform the gross unit weight in the cellular plastics.

G.B. Pat. No. 1,093,899 describes that by the blending of blow-agent-containing polystyrene particles with small amounts of a lipophilic surface-agent there is obtained a material which does not clog during pre-foaming and the cooling time of which during final foaming in molds is reduced to about 50 to 80% of its original value. According to this patent, sorbit esters are preferably used, especially sorbit monoester of lauric acid, stearic acid, palmitic acid or oleic acid.

Now, there have been found foamable particles made from styrene polymers and a volatile blowing agent and a lipophilic surface-active coating agent, wherein the coating agents are mixtures of from 0.05 to 0.5% by weight, calculated on the blowing-agent containing styrene polymer, of mono-, di- and triesters of glycerol with saturated fatty acids having from 12 to 22 carbon atoms, or the mixtures thereof.

The ester mixtures which, according to the invention, are to be used as coating agent are the so-called glycerol fatty acid partial ester mixtures. The ester mixtures preferably contain from 30 to 60% by weight of monoester, from 30 to 60% by weight of diester and from 5 to 20% by weight of triester. There are especially employed glycerol ester mixtures of fatty acid mixtures such as obtained by hydrogenation and saponification of natural fats; these fatty acid mixtures consist mainly of stearic and palmitic acids. The glycerol-fatty-acid partial ester mixtures employed are prepared preferably by means of glycerinolysis of hydrogenated natural fats. Very good results are obtained also with mixtures of mono-, di- and triesters of the glycerol with pure acids, for example, stearic or palmitic acid.

The foamable styrene polymer particles of the invention contain the above-mentioned ester mixtures in an amount of from 0.05 to 0.5% by weight, preferably of from 0.1 to 0.3% by weight, calculated on the blowing-agent-containing styrene polymer.

As styrene polymers for the foamable particles of the invention there are particularly suitable polystyrene and copolymers of the styrene, having up to 30% by weight, preferably up to 20% by weight, preferably up to 20% by weight, of comonomers, for example methylstyrene and/or acrylonitrile.

The foamable particles contain generally of from 5 to 12% by weight of volatile blowing agents. Blowing agents are, for example, lowboiling hydrocarbons, such as n-pentane, i-pentane, or butane, or chlorohydrocarbons, such as dichloromethane and fluorinated chlorohydrocarbons, such as difluoro-dichloromethane. There may be used as well mixtures of these blowing agents. The hydrocarbons are preferably added in an amount of from 5 to 8% by weight and the halogenated hydrocarbons are added preferably in an amount of from 6 to 12% by weight.

The coating agents of the invention are applied, for example, by treating the blowing-agent-containing styrene polymer particles with solutions of the coating agent in a solvent or by applying the powdery coating agent onto the blowing-agent-containing styrene polymer particles, by means of rotating drums.

The foamable particles from styrene polymers of the invention offer an essential shortening of the cooling time during foaming compared to the state of the art, a better bond of the foamed particles and a subtsantially uniform distribution of the gross unit weight in the finished foam block.

The following examples illustrate the present invention.

EXAMPLE 1

30 kg. of polystyrene beads (bead size from 0.4 to 2.5 mm., 85% thereof from 0.8 to 2 mm.; reduced specific viscosity (RSV value) determined at 25° C. by means of an Ubbelohde viscometer with a 1.25% solution in benzene: 0.9 dl./g.; pentane content: 7.2% by weight) were mixed for 15 minutes in a commercially available blender ("Roland-kneader") with 60 g. (0.2%) of a powdery glycerol-fatty acid partial ester mixture, prepared by glycerinolysis of hydrogenated beef tallow, consisting of 45% by weight of monoester, 45% by weight of diester and 10% by weight of triester. This mixture was pre-foamed in a pressure pre-foamer under a vapor pressure of 0.05 atmosphere gauge to yield a bulk density of from 13 to 14 g./l. No clogging was noticed. The prefoamed material which had very good properties, was pneumatically conveyed to a silo and after an intermediate storage time of 24 hours it was filled in a block mold having the following inside dimensions: 2.50 m. x 1.25 m. x 0.50 m.

After a thorough vapor deposition on the mold up to a stream pressure in the interior of the mold of 0.5 atmosphere gauge, there resulted a foam block having a good bond, which, after a cooling time of 11 minutes, could be removed from the mold without subsequent deformation. The cooling time was determined by measuring the deformation of the mold sides. As soon as the deformation of the mold sides was zero, it was possible to remove the block from the mold without further deformation.

A piece of 20 cm. in thickness (dimensions 1.25 x 0.50 m. x 0.20 m.) was cut from the block center and the gross unit weight distribution was determined from the block width in the following way:

The removed piece was cut into stripes having each 5 cm. in thickness, vertically to the edge having a width of 50 cm.; the gross unit weight of the stripes was then determined (weight/volume). The gros unit weight distribution thus determined is represented in FIG. 1 (diagram). With a minimum of 12.8 g./l. and a maximum value of 14.5 g./l., the variation margin was only 1.7 g./l.

Comparative Example for Example 1

A commercial coated blowing agent containing polystyrene in the form of beads, containing 6.9% by weight of pentane was prefoamed, stored for 24 hours and foamed into a block of the same bulk as described in Example 1. A cooling time of 30 minutes was necessary to remove the block from the mold without further bulging. The variation margin of the gross unit weight distribution determined as in Example 1, was 3.9 g./l. with a minimum value of 12.1 g./l. and a maximum value of 16.0 g./l. The graph of FIG. 2 shows the gross unit weight distribution.

EXAMPLE 2

In order to prove that the glycerol fatty acid partial ester mixtures are superior to the sorbit esters used according to G.B. Pat. No. 1,093,899, the substances used in this patent in Example 1 were tested in comparison with a glycerol ester mixture. For this purpose, the polystyrene of Example 1 was mixed with 0.15% of the different esters and pre-foamed, stored and finally foamed into blocks as described in Example 1. The results are shown in Table 1:

TABLE 1

| Coating agent (0.15%) | Pre-foaming Properties | Pre-foaming Bulk density, g./l. | Cooling time, min. | Gross unit weight, g./l. | Variation margin, g./l. | DIN 53 423 Flexural strength, kp./cm.² | DIN 53 423 Deflection at break, mm. |
|---|---|---|---|---|---|---|---|
| Glycerol-fatty-acid-partial-ester mixture [1] | Good | 13.2 | 16 | 13.3 | 1.2 | 1.61 | 8.3 |
| Sorbit-monolaurate [2] | do [3] | 12.5 | 45 | 13.6 | 0.9 | 1.49 | 3.3 |
| Sorbit monopalmitate | do | 13.2 | 38 | 13.8 | 1.8 | 1.51 | 6.9 |
| Sorbit-monostearate | do | 13.0 | 30 | 13.2 | 1.1 | 1.49 | 6.7 |

[1] Prepared by glycerinolysis of hydrogenated coconut oil, 39% mono, 41% di- and 20% of triester.
[2] The sorbit-mono-laurate was mixed with the same amount of n-pentane and added to the polystyrene beads as described in Example 1 of British Patent No. 1,093,899.
[3] Slight difficulties with dosage.

There can be seen from the table that when utilizing glycerol-fatty acid partial ester mixtures, the results will not only be a shorter cooling time but also better mechanical properties of the finished block.

EXAMPLE 3

The same polyestyrene as in Example 1, containing, however, only 6.9% by weight of petane, was mixed with different amounts of the same glycerol-fatty acid partial ester mixture of Example 1 and, as was described there, pre-foamed, stored and foamed to yield a block. The result is shown in Table 2.

TABLE 2

| Fatty acid glycerol ester mixture, percent | Tendency to clogging during pre-foaming | Cooling time, min. | Minimum value, g./l. | Gross unit weight distribution, g./l. (maximum value) | Variation margin, g./l. |
|---|---|---|---|---|---|
| Control | Strong | 88 | 10.5 | 15.7 | 5.2 |
| 0.02 [1] | Low | 34 | 12.4 | 15.0 | 2.6 |
| 0.05 | Very low | 30 | 12.8 | 14.6 | 1.8 |
| 0.10 | No clogging | 21 | 12.2 | 14.0 | 1.8 |
| 0.20 | do | 8 | 13.6 | 15.3 | 1.7 |

[1] Comparison, concentration insufficient.

What is claimed is:

1. Foamable particles of styrene polymer, a volatile blowing agent and a lipophilic surface-active coating agent, wherein the particles contain, as coating agent, from 0.05 to 0.5% by weight, calculated on the blowing-agent-containing styrene polymer, of a mixture of from 30 to 60% by weight of a monoester, 30 to 60% by weight of a diester and 5 to 20% by weight of a triester of glycerol with a saturated fatty acid or a mixture of saturated fatty acids having from 12 to 22 carbon atoms.

2. Foamable particles of styrene polymer according to claim 1, wherein the particles contain a coating agent in an amount of from 0.1 to 0.3% by weight, calculated on the blowing-agent-containing styrene polymer.

3. Foamable particles of styrene polymers as claimed in claim 1 wherein the particles contain as coating agent, glycerol-fatty acid ester mixtures obtained by glycerinolysis of hydrogenated natural fats.

References Cited
UNITED STATES PATENTS
2,989,782   6/1961   Barkuff, Jr., et al. __ 260—2.5 B PAUL LIEBERMAN, Primary Examiner M. FOELAK, Assistant Examiner U.S. Cl. X.R.
117—100 C; 260—235